(12) United States Patent
Nagel

(10) Patent No.: US 11,383,683 B2
(45) Date of Patent: Jul. 12, 2022

(54) PRESSURE GENERATING DEVICE FOR A BRAKING SYSTEM OF A VEHICLE

(71) Applicant: Robert Bosch GmbH, Stuttgart (DE)

(72) Inventor: Willi Nagel, Remseck/Hochdorf (DE)

(73) Assignee: Robert Bosch GmbH, Stuttgart (DE)

( * ) Notice: Subject to any disclaimer, the term of this patent is extended or adjusted under 35 U.S.C. 154(b) by 630 days.

(21) Appl. No.: 16/433,355

(22) Filed: Jun. 6, 2019

(65) Prior Publication Data
US 2020/0017079 A1    Jan. 16, 2020

(30) Foreign Application Priority Data

Jul. 10, 2018  (DE) .......................... 102018211443.9

(51) Int. Cl.
| | |
|---|---|
| *B60T 7/12* | (2006.01) |
| *B60T 7/04* | (2006.01) |
| *F16H 1/22* | (2006.01) |
| *B60T 11/04* | (2006.01) |
| *F16H 25/20* | (2006.01) |

(52) U.S. Cl.
CPC ............... *B60T 7/12* (2013.01); *B60T 7/042* (2013.01); *B60T 11/04* (2013.01); *F16H 1/225* (2013.01); *F16H 2025/209* (2013.01)

(58) Field of Classification Search
CPC .. B60T 11/04; B60T 11/20; B60T 7/12; B60T 7/042; B60T 13/741; B60T 13/745; F16H 1/225; F16H 2025/209; F16H 2057/121; F16D 2121/24; F16D 2123/00; F16D 2125/42; F16D 2125/48; F16D 2125/52; F16D 65/18

USPC ........................................................ 188/110
See application file for complete search history.

(56) References Cited

U.S. PATENT DOCUMENTS

| | | | | |
|---|---|---|---|---|
| 2003/0233899 | A1* | 12/2003 | Ishiyama | F16H 1/16 74/425 |
| 2009/0071279 | A1* | 3/2009 | Huck | E05F 15/697 74/425 |
| 2015/0136542 | A1* | 5/2015 | Goh | F16D 65/18 188/162 |
| 2015/0197231 | A1* | 7/2015 | Winkler | B60T 13/745 303/3 |
| 2015/0308527 | A1* | 10/2015 | Nagel | F16D 65/16 74/89.14 |

FOREIGN PATENT DOCUMENTS

DE        102016216973 A1    3/2018

* cited by examiner

*Primary Examiner* — Robert A. Siconolfi
*Assistant Examiner* — San M Aung
(74) *Attorney, Agent, or Firm* — Norton Rose Fulbright US LLP; Gerard Messina

(57) ABSTRACT

A pressure generating device for a vehicle braking system includes a motor with a worm attached or formed on its motor shaft; a worm gear which, with the aid of a rotation of the motor shaft, can be made to carry out a rotary movement about a rotary axis oriented at an incline to the motor shaft; and a piston that is adjustable at least with the aid of the rotary movement of the worm gear, where a first spindle nut is attached or formed on the worm gear, and at least a first spindle is attached or formed on the piston, the first spindle being adjustable along the rotary axis with the aid of the rotary movement of the worm gear oriented about the rotary axis in such a way that the piston is also adjustable along the rotary axis or in parallel to the rotary axis.

10 Claims, 3 Drawing Sheets

PRESSURE GENERATING DEVICE FOR A BRAKING SYSTEM OF A VEHICLE

CROSS-REFERENCE TO RELATED APPLICATIONS

The present application claims priority under 35 U.S.C. § 119 to DE 10 2018 211 443.9, filed in the Federal Republic of Germany on Jul. 10, 2018, the content of which is hereby incorporated by reference herein in its entirety.

FIELD OF THE INVENTION

The present invention relates to a pressure generating device for a braking system of a vehicle. The present invention furthermore relates to a manufacturing method for a pressure generating device for a braking system of a vehicle.

BACKGROUND

The use of motorized piston-cylinder devices as pressure generating devices in on-board vehicle braking systems is known from the related art. For example, DE 10 2016 216 973 A1 describes such a motorized piston-cylinder device including an electric motor and at least one adjustable piston.

SUMMARY

The present invention is directed to a pressure generating device for a braking system of a vehicle, and is directed to a manufacturing method for a pressure generating device for a braking system of a vehicle.

The present invention creates pressure generating devices in which the at least one piston of the respective pressure generating device is adjustable along an adjustment axis oriented at an incline/perpendicularly to a motor shaft of the respective pressure generating device, whereby a design of the corresponding pressure generating device becomes more compact and space-saving. A longitudinal extension of the pressure generating devices achievable with the aid of the present invention is comparatively short, compared to the related art. As a result, a high degree of freedom exists in the installation of a pressure generating device according to the present invention on a vehicle/motor vehicle. It is therefore possible to install the pressure generating devices created with the aid of the present invention more easily and more comfortably on vehicles/motor vehicles. As is described in greater detail below, during an installation of a pressure generating device according to the present invention on a vehicle/motor vehicle, in particular, the conventional need is dispensed with to arrange the device used for braking pressure generation at a right angle with respect to a driving direction of the vehicle, which in the related art in general triggers installation space problems in the engine compartment.

In an example embodiment, the pressure generating device additionally includes a second worm gear component situated on the worm in such a way that the second worm gear component, with the aid of the rotation of the motor shaft, can be made to carry out a rotary movement about a second rotary axis oriented in parallel with the first rotary axis, a second spindle nut, on which a second spindle is situated in such a way that the second spindle is adjustable along the second rotary axis with the aid of the rotary movement of the second worm gear component oriented about the second rotary axis, being attached or formed on the second worm gear component. In this way, opposing and symmetrical tooth engagements of the first worm gear component and of the second worm gear component are present on the worm. These opposing and symmetrical tooth engagements of the two worm gear components result in the cancellation of radial forces. A further advantage is that the worm, in this example embodiment of the pressure generating device, does not experience any deflection or any flexural stress. As a result, a mounting of a rotor of the electric motor can be assumed by a worm mounting in a "flowing" manner. This results in installation space and cost advantages.

Preferably, the first spindle and the second spindle are connected to each other via a bridge. In this way, an anti-twist protection can be cost-effectively implemented for the two spindles.

For example, the piston can also be adjustable along the first rotary axis with the aid of the first spindle adjusted along the first rotary axis, the pressure generating device additionally encompassing a further piston on which the second spindle is attached or formed in such a way that the further piston is also adjustable along the second rotary axis with the aid of the second spindle adjusted along the second rotary axis. The power split (into a first "power path" extending via the first spindle and the first piston, and a second "power path" extending via the second spindle and the second piston) thus caused at the pressure generating device ensures a balanced loading of the components of this pressure generating device during its operation. The force equilibrium caused with the aid of this power split can moreover be utilized to compensate for tolerances.

In an example embodiment of the pressure generating device, the second spindle as well is attached or formed on the piston in such a way that the piston is also adjustable in parallel to the first rotary axis with the aid of the first spindle adjusted along the first rotary axis and the second spindle adjusted along the second rotary axis. In this way, comparatively great forces can be transmitted via the two spindles onto the single piston.

In an example embodiment, the pressure generating device includes a housing into which a master brake cylinder is integrated. The above-described example embodiments of the pressure generating device can thus be designed in one piece with a master brake cylinder, i.e., components of these example embodiments can be integrated together with components of the master brake cylinder into the shared housing. As is described in more detail hereafter, in this case as well the pressure generating device can have a comparatively space-saving design and is therefore easily mountable on a vehicle/motor vehicle. Moreover, a required effort for mounting a hydraulic braking system equipped with this pressure generating device can be significantly reduced by integrating the master brake cylinder into the shared housing.

Preferably, a center longitudinal axis of the master brake cylinder is oriented perpendicularly to the motor shaft and perpendicularly to the first rotary axis. In this case, a maximum extension of the pressure generating device is, in general, equal to a maximum length of the master brake cylinder along its center longitudinal axis. The example embodiment of the pressure generating device described here can therefore be easily installed in a vehicle/motor vehicle in such a way that the center longitudinal axis of the master brake cylinder is oriented along or in parallel to the driving direction.

In an example embodiment of the pressure generating device, the pressure generating device includes the housing, and a brake fluid reservoir is designed as a cover of the housing. This can also be described in such a way that the housing cover and the brake fluid reservoir are combined into a shared component. In this way, it is possible to form and install a cover for the at least one worm gear component of the pressure generating device and the generally additionally required brake fluid reservoir on the pressure generating device with reduced effort. In this way, an installation space requirement of the pressure generating device equipped with the brake fluid reservoir can also be reduced.

Moreover, the pressure generating device can include the housing, and a magnet can be attached or formed on an end of the motor shaft protruding from the housing, the end of the motor shaft protruding from the housing being covered with the aid of a circuit board attached to the housing, and the circuit board, adjoining the magnet, including a rotor position sensor. In this case, the rotor position sensor can directly detect a rotor position of the motor shaft/of a rotor of the electric motor without complex joining technology.

The above-described advantages are also ensured when a corresponding manufacturing method for a pressure generating device for a braking system of a vehicle is carried out. The manufacturing method can be refined according to the above-described example embodiments of pressure generating devices. Further features and advantages of the present invention are described hereafter based on the figures.

DETAILED DESCRIPTION

Figure 1A:
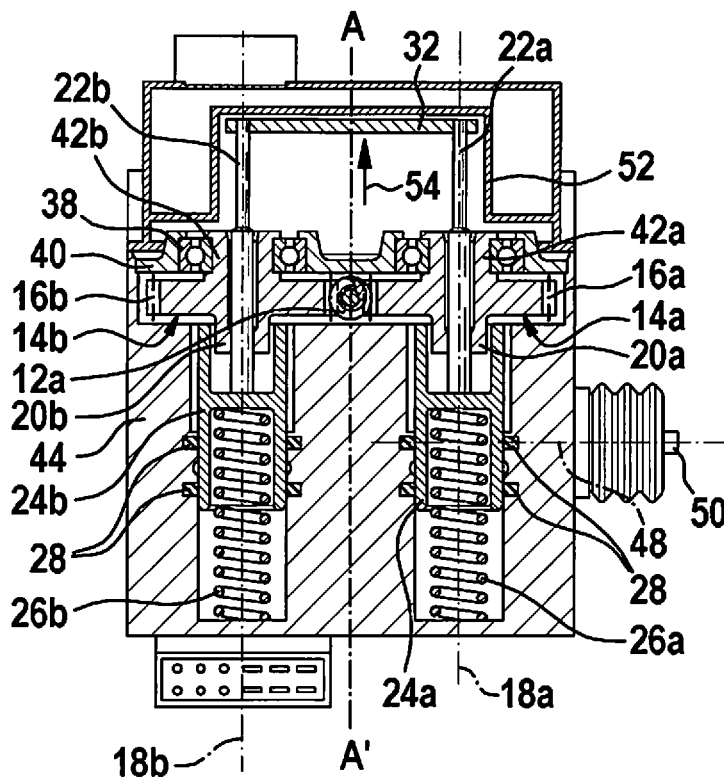
FIGS. 1a-1c show schematic representations of a first example embodiment of the pressure generating device.
Figure 1B:
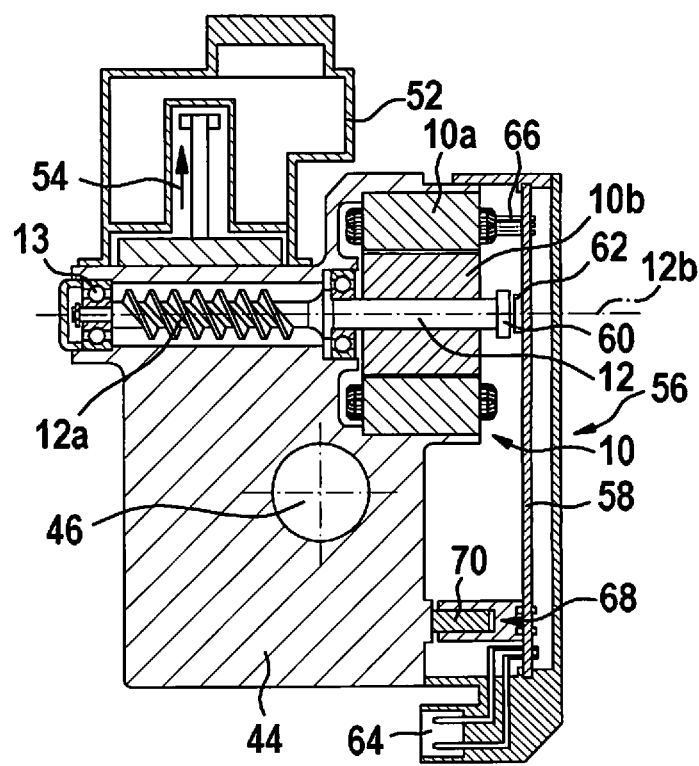
Figure 1C:
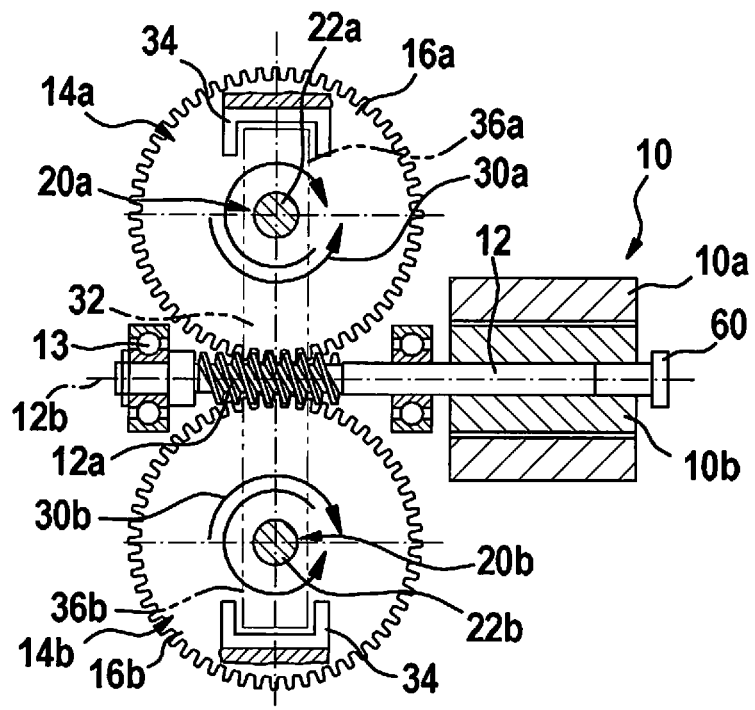

FIGS. 1a-1c show schematic representations of a first example embodiment of the pressure generating device. The pressure generating device schematically represented in FIGS. 1a-1c can be used in a braking system of a vehicle/motor vehicle, a usability of the pressure generating device not being limited to a certain braking system type of the respective braking system and to a specific vehicle type/motor vehicle type of the vehicle/motor vehicle equipped therewith.

The pressure generating device has an electric motor 10 including a stator 10a and a rotor 10b. A worm 12a is attached or formed on a motor shaft 12 of electric motor 10. Worm 12a is rotatable/rotated as part of, or together with, motor shaft 12 by an operation of electric motor 10 about a motor shaft axis 12b extending along a maximum extension of motor shaft 12. Whereas the cross section of FIG. 1a is oriented perpendicularly to motor shaft axis 12b, the cross section of FIG. 1b is in a plane spanned by motor shaft axis 12b and an axis AA' of FIG. 1a. At least one bearing 13 of motor shaft 12 is also apparent in FIG. 1b.

The pressure generating device includes at least one first worm gear component 14a on which a first worm gear 16a is formed. First worm gear 16a of first worm gear component 14a is situated on worm 12a in such a way that first worm gear component 14a can be made/is made to carry out a rotary movement about a first rotary axis 18a oriented at an incline to motor shaft 12/motor shaft axis 12b with the aid of a rotation of motor shaft 12 about its motor shaft axis 12b. Preferably, first worm gear component 14a in this way can be made/is made to carry out a rotary movement about a first rotary axis 18a oriented perpendicularly to motor shaft 12/motor shaft axis 12b. Moreover, a first spindle nut 20a, which also can be made/is made to carry out the rotary movement about first rotary axis 18a with the aid of the rotation of motor shaft 12 about its motor shaft axis 12b, is attached or formed on first worm gear component 14a. (First worm gear 16a and first spindle nut 20a of first worm gear component 14a thus form a compact subassembly.) Moreover, a first spindle 22a is situated on first spindle nut 20a in such a way that first spindle 22a is adjustable/adjusted along first rotary axis 18a with the aid of the rotary movement of first worm gear component 14a oriented about first rotary axis 18a.

The pressure generating device also has at least one first piston 24a on which first spindle 22a is attached or formed. As a result, first piston 24a is also adjustable/adjusted along first rotary axis 18a, or in parallel to first rotary axis 18a, with the aid of first spindle 22a adjusted along first rotary axis 18a. In this way, it is ensured that first piston 24a is adjustable/adjusted with the aid of the rotary movement of first worm gear component 14a in such a way that a pressure build-up can be effectuated/is effectuated in a volume delimited by first piston 24a. For example, first piston 24a can be adjustable/adjusted with the aid of the operation of electric motor 10 against a spring force of a first return spring 26a, at least one seal 28 contacting first piston 24a being able to prevent a brake fluid compressed with the aid of adjustable first piston 24a from seeping out along first piston 24a.

The at least one first piston 24a of the pressure generating device can be adjusted in a direction oriented at an incline/perpendicularly to motor shaft 12/motor shaft axis 12b with the aid of the operation of electric motor 10. It is therefore not necessary to arrange electric motor 10 on the pressure generating device in such a way that its motor shaft 12/motor shaft axis 12b, as is customary in the related art, is oriented along/in parallel to a desired adjustment direction of at least first piston 24a of the pressure generating device. The greater design freedom thus achieved in arranging electric motor 10 on the pressure generating device can be utilized to increase a compactness of the pressure generating device and/or to minimize the pressure generating device. This facilitates an installation of the pressure generating device on the vehicle/motor vehicle to be equipped therewith. For example, the conventional need to orient motor shaft 12/motor shaft axis 12b at a right angle with respect to a driving direction of the vehicle/motor vehicle is dispensed with during an installation of the pressure generating device.

In an example embodiment, the pressure generating device of FIGS. 1a-1c additionally also includes a second worm gear component 14b, which is situated on worm 12a in such a way that second worm gear component 14b as well can be made/is made to carry out a rotary movement about a second rotary axis 18b oriented in parallel with first rotary axis 18a with the aid of the rotation of motor shaft 12 about its motor shaft axis 12b. The two opposing worm gear components 14a and 14b are thus drivable via the shared worm 12a/motor shaft 12. A power split thus occurs on worm 12a, so that almost no strong loading of first worm gear 16a and of a second worm gear 16b formed on second worm gear component 14b is to be feared, even when a comparatively large power is transmitted via worm 12a. In this way, it is possible, for example, to use cost-effective plastic gear wheels as worm gears 14a and 14b. The advantageous arrangement of worm 12a between the two worm gear components 14a and 14b moreover prevents a deflection of worm 12a even when a diameter of worm 12a is comparatively small. In this way, worm 12a can easily be designed to be relatively thin, whereby a higher efficiency of the pressure generating device is achievable.

A second spindle nut 20b is also attached or formed on second worm gear component 14b, which together with second worm gear 16b forms a compact subassembly. A second spindle 22b is situated on second spindle nut 20b in such a way that the second spindle 22b is adjustable/adjusted along second rotary axis 18b with the aid of the rotary movement of second worm gear component 14b oriented about second rotary axis 18b. As is apparent based on the functional principle of FIG. 1c, worm gear components 14a and 14b are moved in mutually opposing rotating directions 30a and 30b with the aid of worm 12a, whereby their spindle nuts 20a and 20b jointly actuate spindles 22a and 22b in the same direction. Preferably, spindle nuts 20a and 20b have different pitch directions (right-handed and left-handed thread) at the same thread pitch.

Preferably, first spindle 22a and second spindle 22b are connected to each other via a bridge 32. Bridge 32 thus acts as an anti-twist protection, which is why stop elements 34 shown in FIG. 1c are optional. In this way, the rotary movements of spindle nuts 20a and 20b oriented in opposite directions can be easily converted into a translational movement of their spindles 22a and 22b, the non-rotating spindles 22a and 22b being supported with the aid of support moments 36a and 36b in opposite directions, which are each oriented counter to the rotating direction 30a and 30b of the adjoining worm gear component 14a or 14b. No guide elements are necessary for a "guidance" of spindles 22a and 22b, so that also no loss of the energy transmitted onto spindles 22a and 22b as a result of friction occurring on the guide element must be tolerated.

In the example embodiment of FIGS. 1a-1c, the pressure generating device, in addition to first piston 24a that is also adjustable along first rotary axis 18a (with the aid of first spindle 22a adjusted along first rotary axis 18a), also includes a further/second piston 24b on which second spindle 22b is attached or formed in such a way that second piston 24b is also adjustable along second rotary axis 18b with the aid of second spindle 22b adjusted along second rotary axis 18b. A second return spring 26b can also be assigned to second piston 24b. Accordingly, second piston 24b is also sealable in a fluid-tight manner with at least one seal 28. Advantages of the connection of first piston 24a to electric motor 10 which were already described above also apply to second piston 24b.

In the pressure generating device shown in FIGS. 1a-1c, each spindle 22a and 22b thus actuates a piston 24a or 24b. Preferably, the two pistons 24a and 24b have an identical piston surface. The two pistons 24a and 24b or the volumes delimited thereby can also be hydraulically connected to each other so that the same pressure force acts on both pistons 24a and 24b. This example embodiment of the pressure generating device can thus also be referred to as a hydraulic force balance, the same axial forces acting on both spindles 22a and 22b and each load path bearing only half of an overall load. The design of the pressure generating device as a hydraulic force balance provides for a compensation of component tolerances or a prevention of over-determinations.

However, the design of the pressure generating device including two worm gear components 14a and 14b, two spindles 22a and 22b, and two pistons 24a and 24b are described above by way of example. An alternative example embodiment of the pressure generating device can include only a single worm gear component, a single spindle and a single piston.

The at least one worm gear component 14a and 14b of the pressure generating device can be mounted on a respective bearing cover 40 via a respective rolling bearing 38, such as a ball bearing or a roller bearing. The respective rolling bearing 38 can be seated on a bearing shaft 42a or 42b of the respective worm gear component 14a or 14b. The respective bearing shaft 42a or 42b can be a steel sleeve, for example, which is extrusion-coated with at least one plastic material to form the respective worm gear 16a or 16b and the respective spindle nut 20a or 20b. The respective bearing shaft 42a or 42b can also be formed of plastic material (together with the respective worm gear 16a or 16b and the respective spindle nut 20a or 20b). Optionally, either only a single plastic material or multiple (function-optimized) plastic materials can be used to form worm gear 16a or 16b and spindle nut 22a or 22b (and possibly bearing shaft 42a or 42b).

The above-described components of the pressure generating device of FIGS. 1a-1c are integrated into a housing 44. Housing 44 can be made of aluminum, for example. In particular, housing 44 can be manufactured from an extruded profile. In this case, housing 44 can also easily directly enclose (as a motor housing) stator 10a of electric motor 10. This case is also referred to as an integration of the motor housing into housing 44. By designing housing 44 from an extruded profile, it can be ensured that housing 44 as the motor housing easily withstands even a high machining complexity. As an alternative, electric motor 10 can also include a dedicated motor housing that is mountable in housing 44 as a separate assembly (not shown).

In an example embodiment, a master brake cylinder 46 is also integrated into housing 44 in the example embodiment of FIGS. 1a-1c. A center longitudinal axis 48 of master brake cylinder 46, which in general extends along an input rod 50 of master brake cylinder 46, is oriented perpendicularly to motor shaft 12/motor shaft axis 12b and perpendicularly to first rotary axis 18a. Such an orientation of master brake cylinder 46 allows a compact and space-saving design of the pressure generating device, despite the additional integration of master brake cylinder 46 therein.

Moreover, a brake fluid reservoir 52 is formed as a housing cover 52 of housing 44 schematically shown in FIGS. 1a and 1b. Brake fluid reservoir 52 required for the pressure generating device (and, if present, also for master brake cylinder 46) can thus be utilized as a cover/seal of worm gear components 14a and 14b and of spindles 22a and 22b protruding therefrom. Such a combination of housing cover 52 and brake fluid reservoir 52 in a single component reduces the manufacturing costs for the pressure generating device and, at the same time, facilitates a minimization thereof. In particular, a protrusion of the at least one spindle 22a and 22b from housing 44 can be concealed in a space-saving manner with the aid of a cavity 54 formed on an inner side of brake fluid reservoir/housing cover 52.

As an optional refinement, the pressure generating device can also include control unit 56 shown in FIG. 1b, it being possible for control unit 56 or its circuit board 58 to be attached on housing 44 as an additional cover element. In particular, an end of motor shaft 12 protruding from housing 44 can be covered with the aid of circuit board 58 attached to housing 44. In this case, the pressure generating device preferably also includes a magnet 60, such as a bar magnet 60, at the end of motor shaft 12 protruding from housing 44. A rotor position sensor 62 situated adjoining magnet 60 on circuit board 58 can thus be used for the direct detection of a rotor position of motor shaft 12, without complex joining technology. This creates a comparatively robust and relatively cost-effective connection of rotor position sensor 62, which is used for the direct detection of the rotor position of motor shaft 12, to control unit 56 in a simple manner.

Control unit 56 or its circuit board 58 can be supplied with power via a simple plug 64. Stator 10a of electric motor 10 can also be supplied with power via a plug connection 66 to circuit board 58. As an advantageous supplement, at least one solenoid coil 68 for switching a respective solenoid valve 70 partially inserted into housing 44 can also be formed on circuit board 58.

Figure 2:
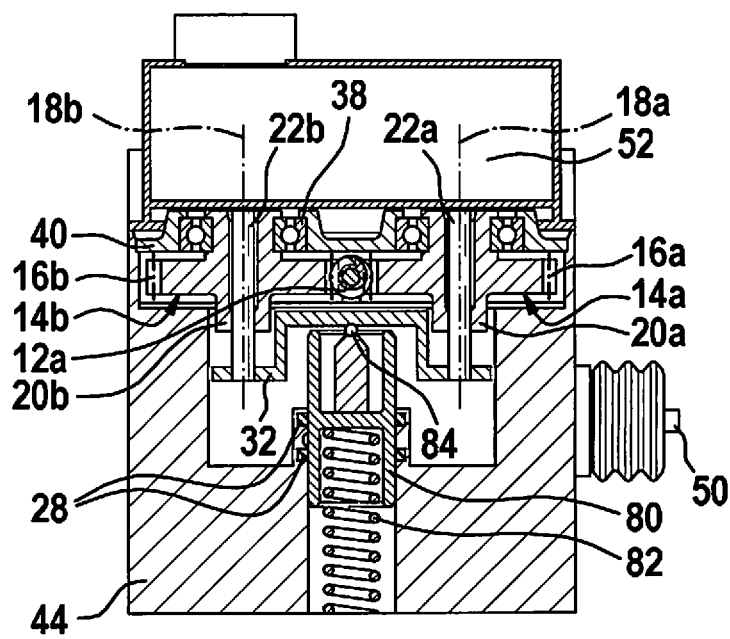
FIG. 2 shows a schematic representation of a second example embodiment of the pressure generating device.

FIG. 2 shows a schematic representation of a second example embodiment of the pressure generating device.

The pressure generating device schematically shown in FIG. 2 differs from the above-described example embodiment only in that it includes only single piston 80, which is supported with the aid of a return spring 82 and sealed with the aid of at least one seal 28. Single piston 80 is connected to bridge 32, preferably via a bearing 84, in such a way that first spindle 22a and second spindle 22b are attached to single piston 80. Single piston 80 is thus also adjustable in parallel to first rotary axis 18a with the aid of first spindle 22a adjusted along first rotary axis 18a and second spindle 22b adjusted along second rotary axis 18b. An overall force transmitted with the aid of spindles 22a and 22b thus acts on piston 80 in such a way that even relatively large counter forces acting on piston 80 can be easily overcome.

A connection of two spindles 22a and 22b via bridge 32 to piston 80 is preferably symmetrical. In this case, a traditional mechanical force balance is formed on the pressure generating device, which is suitable for compensating for tolerances in the axial direction.

By way of example, the above-described pressure generating devices are each integratable into a hydraulic system of a braking system as an integrated power brake (IPB). Each of the above-described pressure generating devices can be used for the autonomous/driver-independent or driver-assisting increase of a brake pressure in at least one wheel brake cylinder of the braking system equipped therewith. However, it is pointed out that (potentially slightly modified) example embodiments of the pressure generating devices can also be used for the autonomous/driver-independent or driver-assisting increase of a pressure present in a master brake cylinder.

Figure 3:
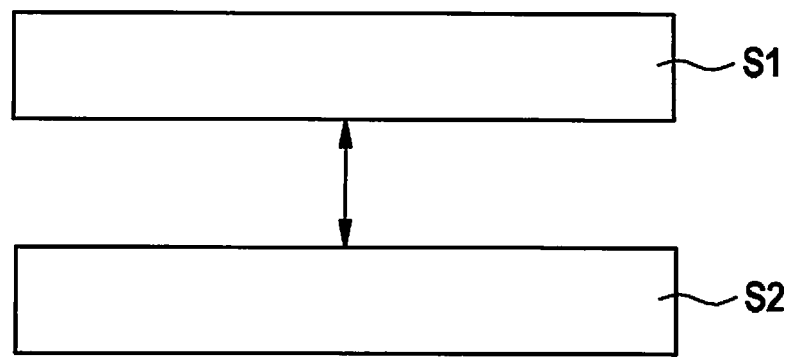
FIG. 3 is a flowchart that illustrates a manufacturing method for a pressure generating device for a braking system of a vehicle, according to an example embodiment of the present invention.

FIG. 3 is a flowchart illustrating a manufacturing method for a pressure generating device for a braking system of a vehicle, according to an example embodiment of the present invention. For example, one of the above-described pressure generating devices can be created with the aid of the manufacturing method described here. However, an ability to carry out the manufacturing method is not limited to the manufacture of these pressure generating devices.

In a method step S1, a first worm gear component is situated on a worm attached or formed on a motor shaft of an electric motor in such a way that the first worm gear component, with the aid of a rotation of the motor shaft, is made to carry out a rotary movement about a first rotary axis oriented at an incline/perpendicularly to the motor shaft.

In a method step S2, at least one piston is arranged in such a way that the piston is adjusted at least with the aid of the rotary movement of the first worm gear component. This takes place by arranging a first spindle attached or formed on the piston in such a way on a first spindle nut attached or formed on the first worm gear component that the first spindle is adjusted along the first rotary axis with the aid of the rotary movement of the first worm gear component oriented about the first rotary axis, the piston being also adjusted along the first rotary axis or in parallel to the first rotary axis with the aid of the first spindle adjusted along the first rotary axis.

Method steps S1 and S2 can be carried out in any arbitrary order, simultaneously, or with temporal overlap. The manufacturing method can be also be refined according to the above-described pressure generating devices.

What is claimed is:

1. A pressure generating device for a braking system of a vehicle, the pressure generating device comprising:
   an electric motor including a motor shaft and a worm attached or formed on the motor shaft;
   a first worm gear arranged on the worm such that the first worm gear can be caused to carry out a rotary movement about a first rotary axis oriented at an incline to the motor shaft due to a rotation of the motor shaft; and
   a first piston that is adjustable at least by the rotary movement of the first worm gear;
   wherein:
      a first spindle nut is attached or formed on the first worm gear; and
      a first spindle is attached or formed on the first piston and is arranged on the first spindle nut such that the first spindle, by the rotary movement of the first worm gear about the first rotary axis, is adjustable along the first rotary axis such that the first piston is also adjustable along the first rotary axis or in parallel to the first rotary axis by the first spindle adjusted along the first rotary axis.

2. The pressure generating device of claim 1, further comprising a second worm gear arranged on the worm such that the second worm gear can be caused to carry out a rotary movement about a second rotary axis oriented parallel to the first rotary axis due to the rotation of the motor shaft, wherein a second spindle nut, on which a second spindle is situated such that the second spindle is adjustable along the second rotary axis by the rotary movement of the second worm gear about the second rotary axis, is attached or formed on the second worm gear.

3. The pressure generating device of claim 2, wherein the first spindle and the second spindle are connected to each other via a bridge.

4. The pressure generating device of claim 2, wherein the first piston is also adjustable along the first rotary axis by the first spindle being adjusted along the first rotary axis, and the pressure generating device further comprises a second piston on which the second spindle is attached or formed such that the second piston is also adjustable along the second rotary axis the second spindle being adjusted along the second rotary axis.

5. The pressure generating device of claim 2, wherein the second spindle is attached or formed on the piston in such a way that the piston is also adjustable in parallel to the first rotary axis by the first spindle being adjusted along the first rotary axis and the second spindle being adjusted along the second rotary axis.

6. The pressure generating device of claim 1, further comprising a housing into which a master brake cylinder is integrated.

7. The pressure generating device of claim 6, wherein a center longitudinal axis of the master brake cylinder is oriented perpendicularly to the motor shaft and perpendicularly to the first rotary axis.

8. The pressure generating device of claim 1, further comprising a housing and a brake fluid reservoir designed as a housing cover of the housing.

9. The pressure generating device of claim 1, further comprising a housing, wherein a magnet with a rotor position sensor is attached or formed on an end of the motor shaft protruding from the housing, the end of the motor shaft protruding from the housing being covered at least partially by a circuit board that is attached to the housing and that adjoins the magnet.

10. A method of manufacturing a pressure generating device for a braking system of a vehicle, the method comprising:
  arranging a first worm gear on a worm attached or formed on a motor shaft of an electric motor such that the first worm gear, due to a rotation of motor shaft, carries out a rotary movement about a first rotary axis oriented at an incline to the motor shaft;
  arranging a first piston such that the first piston is adjusted by the rotary movement of the first worm gear component; and
  situating a first spindle, which attached or formed on the first piston, on a first spindle nut attached or formed on the first worm gear such that the first spindle is adjusted along the first rotary axis by the rotary movement of the first worm gear about the first rotary axis, the first piston being adjusted along or in parallel to the first rotary axis by the first spindle being adjusted along the first rotary axis.

\* \* \* \* \*